United States Patent
Meempat et al.

(10) Patent No.: US 11,290,917 B2
(45) Date of Patent: Mar. 29, 2022

(54) APPARATUSES AND METHODS FOR ESTIMATING THROUGHPUT IN ACCORDANCE WITH QUALITY OF SERVICE PRIORITIZATION AND CARRIER AGGREGATION TO FACILITATE NETWORK RESOURCE DIMENSIONING

(71) Applicant: AT&T Intellectual Property I, L.P., Atlanta, GA (US)

(72) Inventors: Gopalakrishnan Meempat, East Brunswick, NJ (US); Huahui Wang, Bridgewater, NJ (US); Ravi Raina, Skillman, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 61 days.

(21) Appl. No.: 16/868,612

(22) Filed: May 7, 2020

(65) Prior Publication Data
US 2021/0352530 A1    Nov. 11, 2021

(51) Int. Cl.
*H04W 28/10* (2009.01)
*H04W 28/02* (2009.01)

(52) U.S. Cl.
CPC ....... *H04W 28/10* (2013.01); *H04W 28/0231* (2013.01); *H04W 28/0289* (2013.01)

(58) Field of Classification Search
CPC ............. H04W 28/10; H04W 28/0231; H04W 28/0289
See application file for complete search history.

(56) References Cited

U.S. PATENT DOCUMENTS

| | | | |
|---|---|---|---|
| 8,761,102 | B2 | 6/2014 | Puthenpura et al. |
| 2009/0163223 | A1 | 6/2009 | Casey |
| 2012/0224481 | A1* | 9/2012 | Babiarz ............... H04L 41/5022 370/230.1 |
| 2013/0242777 | A1* | 9/2013 | Choi ................. H04W 72/0446 370/252 |
| 2016/0119816 | A1* | 4/2016 | Yasukawa ........... H04L 43/0876 455/453 |
| 2017/0367081 | A1 | 12/2017 | Cui |
| 2018/0070245 | A1 | 3/2018 | Liao et al. |
| 2018/0368037 | A1* | 12/2018 | Wang .................. H04L 41/0816 |
| 2019/0075055 | A1 | 3/2019 | Esserman et al. |
| 2019/0335340 | A1* | 10/2019 | Scanferla .............. H04W 16/18 |

(Continued)

OTHER PUBLICATIONS

Fayolle, G. et al., "Sharing a Processor Among Many Job Classes", https://www.researchgate.net/publication/234829395, Jul. 1, 1980, 15 pgs.

(Continued)

*Primary Examiner* — Donald L Mills
(74) *Attorney, Agent, or Firm* — Guntin & Gust, PLC; Robert Gingher

(57) ABSTRACT

Aspects of the subject disclosure may include, for example, calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput. Other embodiments are disclosed.

20 Claims, 8 Drawing Sheets

(56) References Cited

U.S. PATENT DOCUMENTS

2019/0335342 A1    10/2019  Jacinto et al.
2021/0258800 A1*   8/2021   Yang .................... H04W 16/22

OTHER PUBLICATIONS

Shepherd, Paul, "Learn about QoS in 5GG Networks by Paul Shedpherd", Learn about QoS in 5GG Networks by Paul Shedpherd (https://www.awardsolutions.com), http://www.awardsolutions.com/, Jan. 1, 2020, 5 pgs.

* cited by examiner

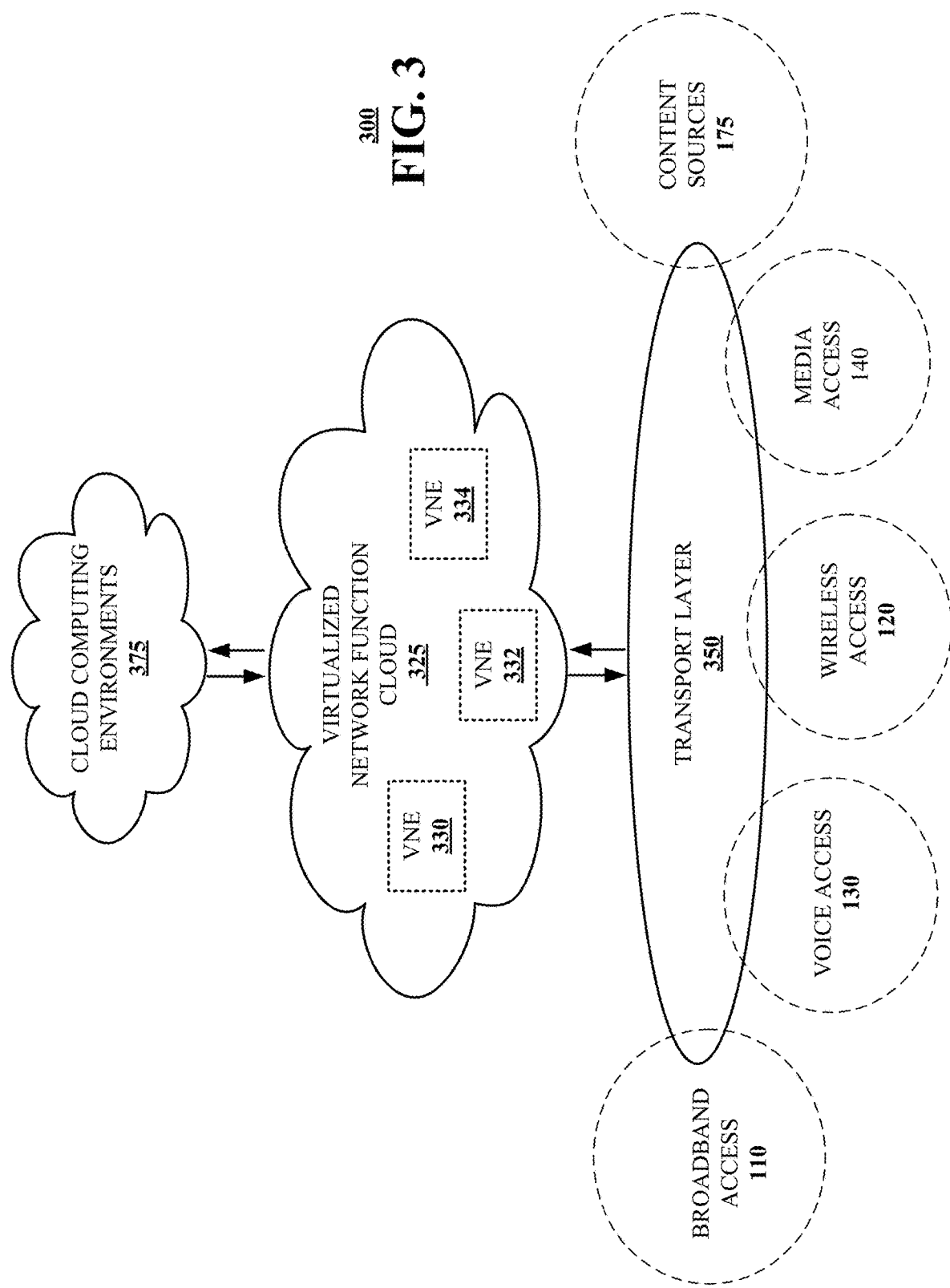

APPARATUSES AND METHODS FOR ESTIMATING THROUGHPUT IN ACCORDANCE WITH QUALITY OF SERVICE PRIORITIZATION AND CARRIER AGGREGATION TO FACILITATE NETWORK RESOURCE DIMENSIONING

FIELD OF THE DISCLOSURE

The subject disclosure relates to apparatuses and methods for estimating throughput in accordance with quality of service prioritization and carrier aggregation.

BACKGROUND

As the world becomes increasingly connected via vast communication networks and communication devices, additional challenges are created/generated from the perspective of provisioning and managing network resources. For example, from a perspective of a network operator, a policy that favors cost reduction (e.g., cost minimization) while deemphasizing (e.g., disregarding/ignoring) quality of service (QoS) parameters runs a risk of degradation in terms of a user's quality of experience (QoE). The reduction in QoE may tend to alienate/annoy the user, potentially to the point that the user may terminate service with the network operator. On the other hand, a policy that conservatively allocates resources (e.g., spectrum, bandwidth, etc.) to ensure high levels of QoS or QoE, without taking into account fine-grain QoS considerations, runs a risk of wasteful/unnecessary surplus investment.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for distributing traffic and allocating resources to achieve maximal UE throughput amongst a plurality of cells of a network or system. Other embodiments are described in the subject disclosure.

One or more aspects of the subject disclosure include, in whole or in part, distributing carrier aggregated traffic amongst a plurality of cells of a network, initializing a first plurality of scheduler weights for each cell of the plurality of cells, wherein for each cell, each of the first plurality of weights is associated with a respective traffic class included in a plurality of traffic classes, calculating an average user equipment (UE) throughput of each cell of the plurality of cells, distinctly for the carrier aggregated (CA) and non-aggregated (non-CA) components of each class of the plurality of classes, calculating a total average UE throughput of the carrier aggregated component of each of the plurality of classes in accordance with the calculating of the throughput of each cell (by aggregation), and redistributing the carrier aggregated traffic amongst the plurality of cells based on the corresponding throughput for each cell and the total throughput.

One or more aspects of the subject disclosure include, in whole or in part, calculating a UE throughput of each cell of a plurality of cells of a communication network, calculating a total carrier aggregated UE throughput of each class among a plurality of classes in accordance with the calculating of the component throughput of each cell, and redistributing carrier aggregated traffic amongst the plurality of cells, wherein each cell obtains a respective portion of the carrier aggregated traffic as part of the redistributing in proportion to a ratio of the throughput from the cell relative to the total throughput.

One or more aspects of the subject disclosure include, in whole or in part, calculating a throughput of each cell of a plurality of cells of a communication network, calculating a total carrier aggregated UE throughput of each classes among a plurality of classes, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

Figure 1:
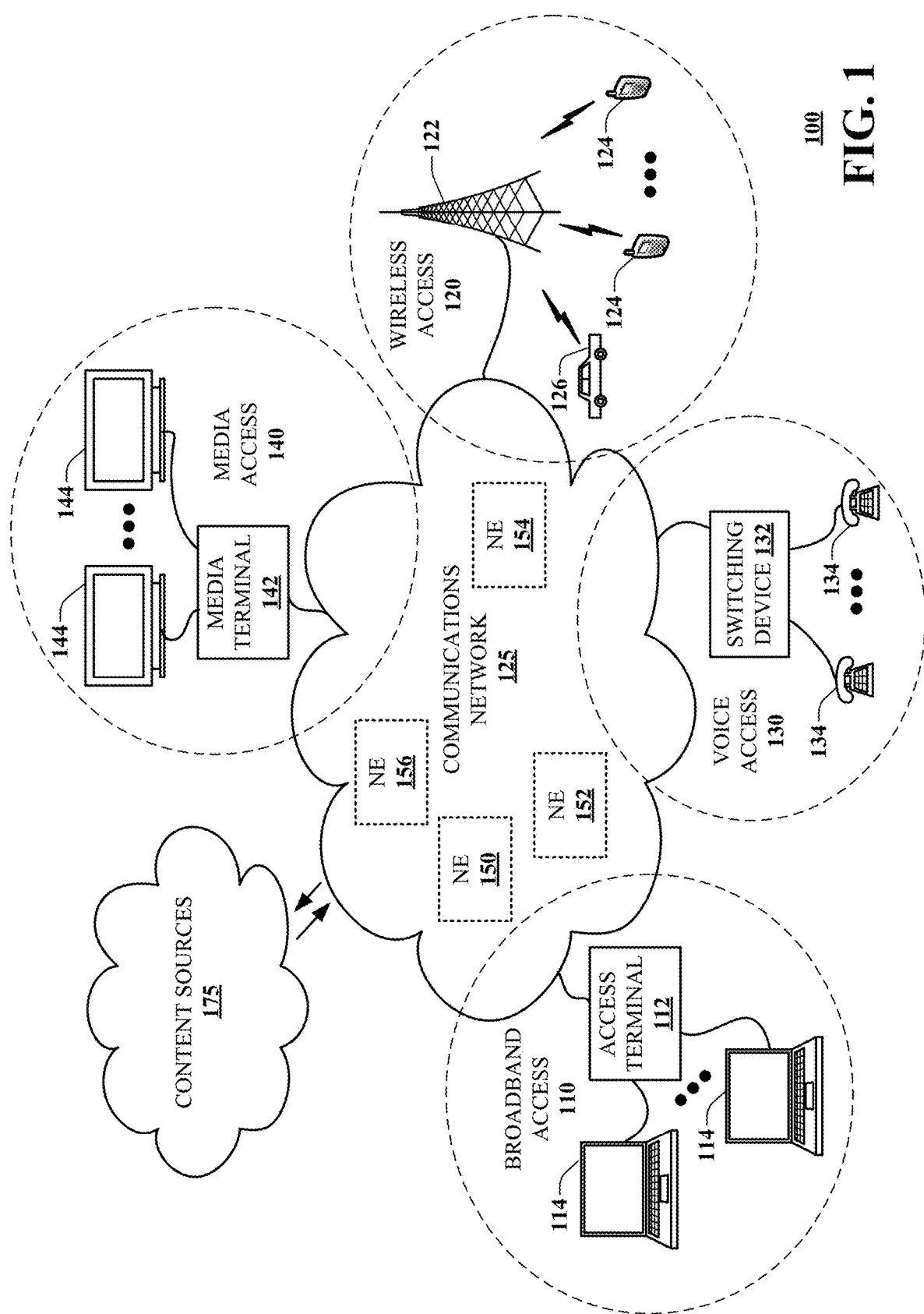
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part distributing carrier aggregated traffic amongst a plurality of cells of a network, initializing a first plurality of weights for each cell of the plurality of cells, wherein for each cell, each of the first plurality of weights is associated with a respective traffic class included in a plurality of traffic classes, calculating a throughput of each cell of the plurality of cells, calculating a total throughput of the plurality of cells in accordance with the calculating of the throughput of each cell, and redistributing the carrier aggregated traffic amongst the plurality of cells based on the throughput of each cell and the total throughput. Communications network 100 can facilitate in whole or in part calculating a throughput of each cell of a plurality of cells of a communication network, calculating a total throughput of the plurality of cells in accordance with the calculating of the throughput of each cell, and redistributing carrier aggregated traffic amongst the plurality of cells, wherein each cell obtains a respective portion of the carrier aggregated traffic as part of the redistributing in proportion to a ratio of the throughput of the cell relative to the total throughput. Communications network 100 can facilitate in whole or in part calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
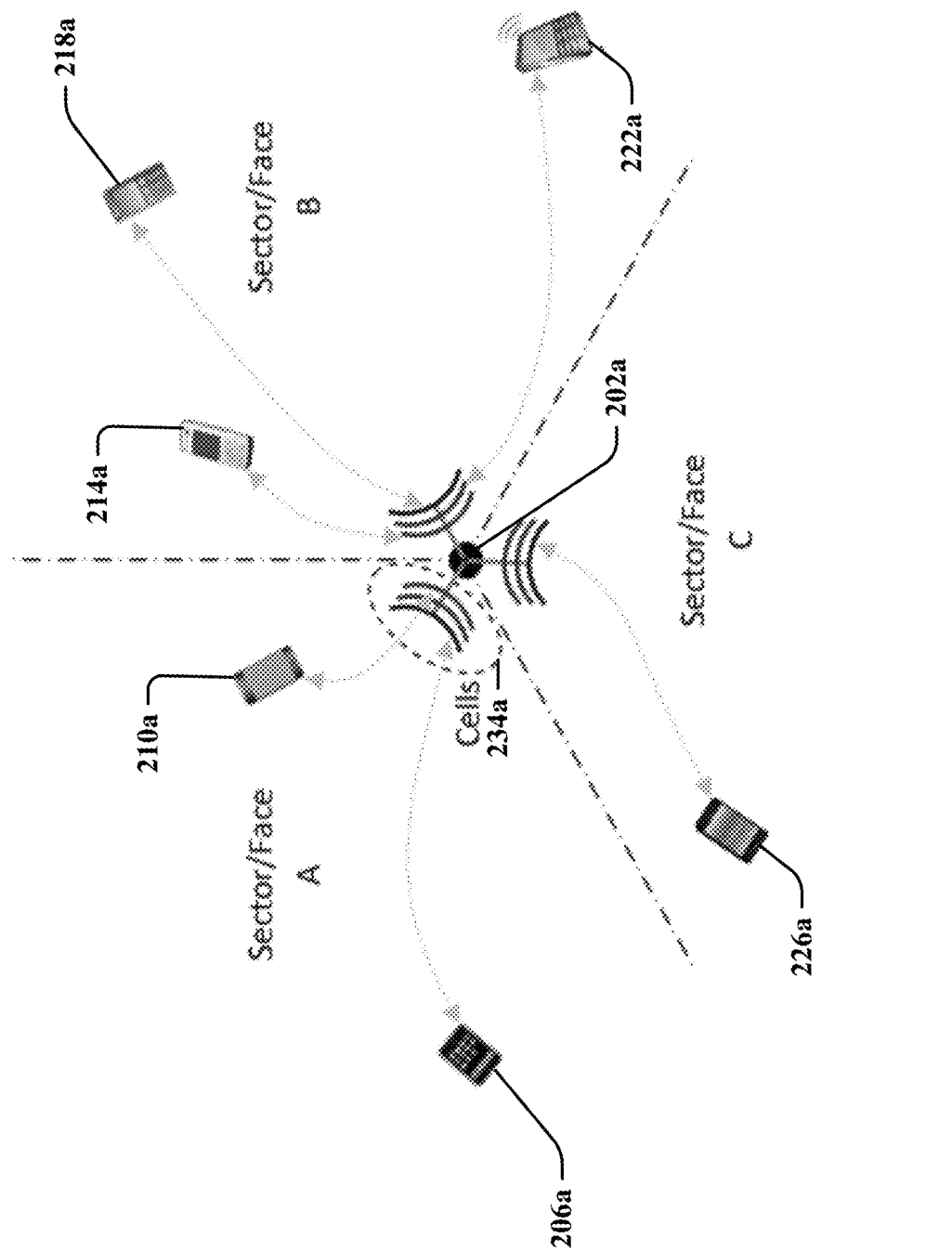
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. In particular, the system 200a may include a tower/base station 202a that may be used to provide service to one or more communication devices, e.g., communication devices 206a, 210a, 214a, 218a, 222a, and 226a. The tower 202a may be communicatively linked/coupled to backhaul infrastructure (not shown in FIG. 2A) via wired and/or wireless connections.

The coverage provided by the tower 202a may be divided into multiple sectors/faces, such as for example three sectors/faces denoted as sector/face A, second/face B, and sector/face C in FIG. 2A. Each of the sectors/faces may be further divided into multiple cells, e.g., cell 234a in FIG. 2A. Each cell within a sector/face may operate at a distinct carrier frequency. The use of multiple carrier frequencies within a sector/face may enhance a data carrying capacity, which in turn may enhance a quality of experience (QoE) or quality of service (QoS).

In the instance of the exemplary system 200a shown in FIG. 2A, the communication devices 206a and 210a may obtain service via the sector/face A, the communication devices 214a-222a may obtain service via the sector/face B, and the communication device 226a may obtain service via the sector/face C. However, one or more of the communication devices 206a-226a may be a mobile device and may migrate from a scope of coverage associated with a first sector/face (e.g., sector/face A) to a scope of coverage associated with a second sector/face (e.g., sector/face B). In this regard, the tower 202a may facilitate a handover of service (e.g., a handover of a communication session) from the first sector/face to the second sector/face. Still further, in some embodiments a handover of service may be provided from the tower 202a to another tower (not shown in FIG. 2A) if a communication device leaves the range of coverage provided by any of the sectors/faces associated with the tower 202a.

In accordance with aspects of this disclosure, one or more of the communication devices 206a-226a may be configured to simultaneously connect to multiple carriers/cells in order to increase the throughput realized by the communication device(s). For example, in relation to an execution of a streaming video application by a communication device, the (simultaneous) utilization of multiple carriers by the communication device (the condition of which is referred to herein as carrier aggregation [CA]) may enhance/increase the amount of data associated with the video that is obtained by the communication device (where the amount of data may be expressed per unit of time). The implementation of carrier aggregation may result in fewer (if any) buffering delays at the communication device, and may result in a smoother (e.g., less choppy) playback of the video at the communication device. In this regard, the QoE associated with the use of the communication device may be enhanced as a result of the communication device utilizing CA. As an example, CA can include multiple frequency blocks or component carriers being assigned to a single user or single channel.

On the other hand, one or more of the communication devices 206a-226a might not be configured to support carrier aggregation (such devices being referred to herein as non-CA devices). For example, and ignoring/excluding principles of a soft-handover (e.g., make-before-break) of a communication session that may be facilitated by a non-CA device, non-CA devices might only be able to connect to a service via a single cell/carrier at a given point in time. Thus, all other conditions being equal, non-CA devices might not able to leverage the benefits of increased throughput that may be obtained by their CA device counterparts. Note that the advantage of carrier aggregation may manifest itself only under light to medium loading conditions; under heavy load/network congestion, the scheduler weights may be automatically adjusted so as to counteract this advantage and ensure fairness across all UE's (CA or non-CA) belonging to each application class.

During periods of low network traffic (e.g., network traffic in an amount less than a threshold), the utilization of multiple carriers/cells by CA devices might not directly impact the QoE/QoS of non-CA devices, as there may be sufficient resources (e.g., carriers) available to the non-CA devices. However, during periods of high network traffic (e.g., network traffic in an amount greater than the threshold), the utilization of multiple carriers/cells by the CA devices may adversely impact the QoE/QoS of the non-CA devices. Accordingly, aspects of this disclosure are directed to determinations of how to allocate resources between CA and non-CA devices generally, and more specifically, how to allocate such resources in response to changing/dynamic network conditions.

Figure 2B:
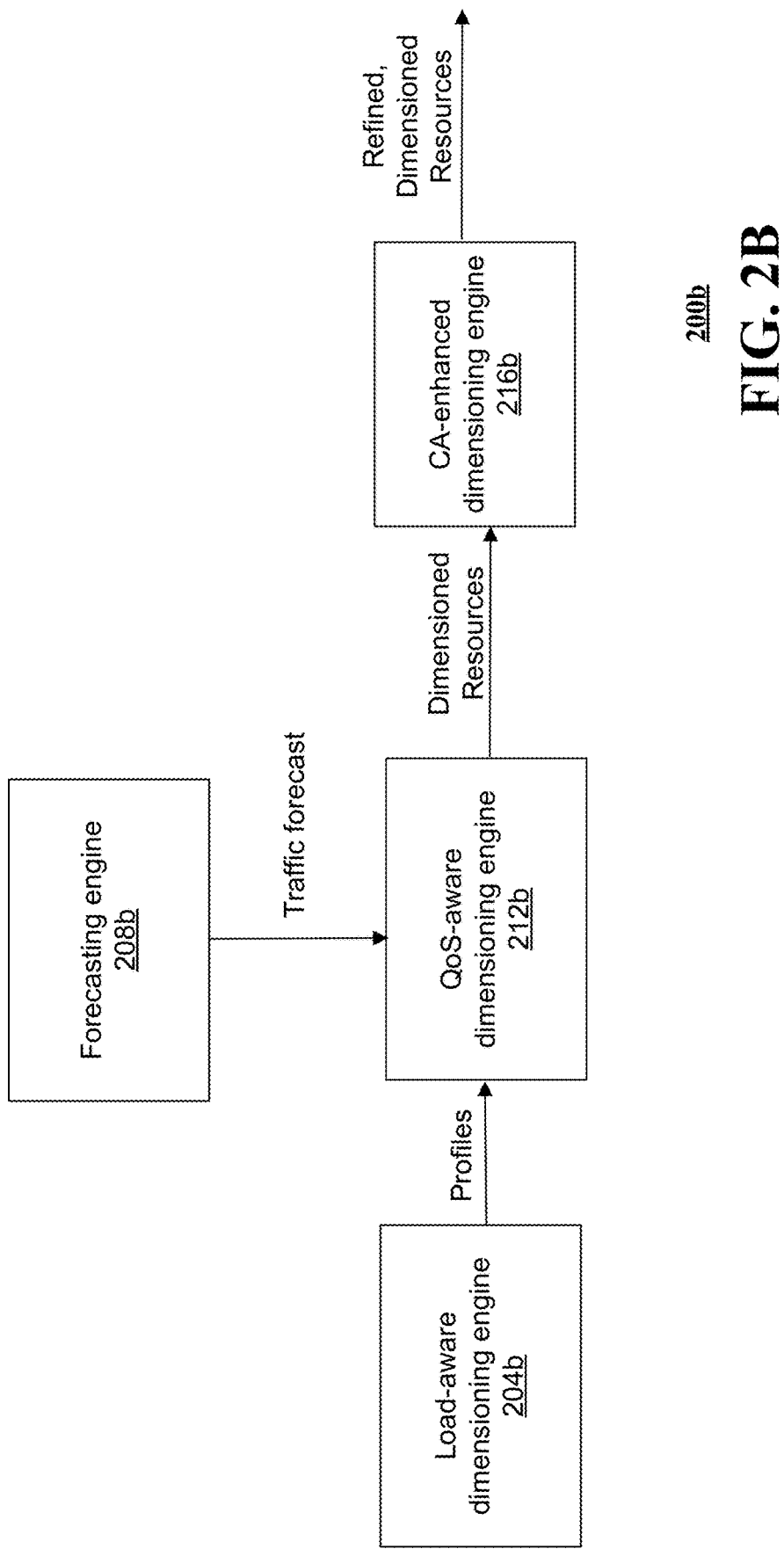
FIG. 2B is a block diagram illustrating an example, non-limiting embodiment of a system functioning within the system of FIG. 2A in accordance with various aspects described herein.

Aspects of the system 200a may be implemented in conjunction with an allocation of resources. To demonstrate, and referring to FIG. 2B, a system 200b is shown that may be used to dimension/allocate resources (e.g., radio resources, communication bandwidth, control resources, etc.) associated with a communication network or system, such as the system 200a of FIG. 2A. The system 200b may include a load-aware dimensioning engine 204b, a forecasting engine 208b, a QoS-aware dimensioning engine 212b, and a CA-enhanced dimensioning engine 216b. While the engines 204b-216b are shown separately in FIG. 2B, a first of the engines (e.g., engine 212b) may be combined with one or more other engines (e.g., engine 216b) in some embodiments.

The load-aware dimensioning engine 204b may generate profiles for, e.g., each cell i of the network or system, among a load balanced group of cells indexed i=1, ..., $\Psi$ (e.g., the plurality of cells serving a single sector/face of a wireless site). The profiles, which may include or be based on various parameters (e.g., signals, interference, noise, etc.), may be specified in an uplink direction, a downlink direction, or both uplink and downlink directions. In some embodiments, one or more of the parameters may be combined in connection with a given profile. For example, in some embodiments the load-aware dimensioning engine 204b may generate a signal-to-interference-plus-noise (SINR) profile for a given cell. The SINR profile may be based at least in part on estimates/projections of one or more communication devices being located within the cell, estimates/projections of one or more communication sessions of the communication device(s) falling within a given SINR class/category, estimates/projections and/or measurements of throughput within the given SINR class/category, and/or estimates/projections and/or measurements of interference caused by other communication device in nearby (e.g., adjacent or neighboring) sectors and/or cells. Focusing on the downlink direction as an exemplary embodiment (uplink being analogous), by processing the SINR profiles in conjunction with the known spectrum bandwidth configurations, the load aware dimensioning engine may estimate a capacity $C_i$ (in, e.g., Mbps) for each cell i=1, ..., $\Psi$ in a load balanced group of cells.

The forecasting engine 208b may generate forecasts of traffic in the network or system. The forecasts may be based on traffic projections at a given level of granularity. In some embodiments, the generation of the forecasts may take into consideration a type of traffic (e.g., voice and video), and elasticity in terms of data volume at different priority levels/classes.

The QoS-aware dimensioning engine 212b may be operative on the outputs of the load-aware dimensioning engine 204b and the forecasting engine 208b to provide/generate dimensioned resource allocations. The resource allocations generated by the QoS-aware dimensioning engine 212b may be provided as input to the CA-enhanced dimensioning engine 216b. The CA-enhanced dimensioning engine 216b may be operative on the dimensioned resource allocations received from the QoS-aware dimensioning engine 212b to generate refined/enhanced dimensioned resource allocations. Aspects of the refinement/enhancement of the dimensioned resource allocations provided by the CA-enhanced dimensioning engine 216b may conform to aspects of this disclosure set forth below.

As described above, aspects of the disclosure may incorporate/segment traffic into multiple, different priority classes. In the examples that follow, it may be assumed that there are two guaranteed traffic classes (corresponding to an index of k=0 and k=1). For example, the guaranteed traffic classes may correspond to: (1) conversational voice (k=0), e.g., voice over internet protocol [VoIP], and (2) conversational video (k=1), e.g., live streaming. Still further, it may be assumed that there are four elastic data classes (corresponding to indices of k=2 through k=5). The elastic data classes each may correspond to/include any combination of buffered video, email, text (documents, chat), file transfers, peer-to-peer file sharing, progressive video, and interactive gaming. One skilled in the art would appreciate that these assumptions may be relaxed to provide for more or less guaranteed traffic classes and/or more or less elastic data classes. For example, in some embodiments there may be up to 'M' number of different classes, where each class may be associated with/assigned a respective index 'k' from k=0 through k=M−1. This disclosure concerns with network resource dimensioning for elastic traffic classes with distinct QOE targets, and supporting both carrier aggregated and non-aggregated UE devices. Traffic estimates corresponding to the two guaranteed traffic classes (k=0,1) furnished by the forecasting engine 208b may be subtracted from the capacity $C_i$ of each cell i=1, ..., $\Psi$ in the load balancing group, to estimate the respective portion $D_i$ available to carry elastic data.

Given the elastic data capacity D in a given individual cell (estimated from the procedures as outlined above), and assuming that a priority class k incurs a resource utilization $Q_k$ (which equals the class k traffic volume $J_k$ in, e.g., Mbps divided by the elastic data capacity D), the average communication device throughput $T_k$ for each of the M−2 elastic priority classes may be determined/calculated in accordance with the following system of equations (hereinafter referred to as the Fayolle equations or matrix formula):

$$x_k \times [1 - \Sigma_j((Q_j \times w_j)/(w_j + w_k))] - [\Sigma_j((Q_j \times w_j \times x_j)/(w_j + w_k))] = 1/D,$$

where the summation operator ($\Sigma_j$) is applied over all 'j' from j=2 to j=M−1, and there exists a distinct linear equation in the system, for each value of k=2, ..., M−1 (guaranteed classes 0 and 1 excluded). The value $w_k$ is representative of a weight applied to the $k^{th}$ priority class. The weights $\{w_k\}$ may be used to prioritize a first class (e.g., k=2) relative to the other classes (e.g., k=3, 4, 5, etc.). Once the values $x_k$ are known/computed, the throughputs ($T_k$) may be obtained as the inverse of those values, i.e., $T_k = 1/x_k$, k=2, ..., M−1.

Aspects of this disclosure may utilize the principles set forth above to derive/obtain throughput values for CA and non-CA devices when CA and non-CA devices co-exist with one another (e.g., are simultaneously operative) in a given network or system. In particular, attributes of CA devices may be mathematically abstracted by treating as special/separate QoS/priority classes with dynamic priority weights. The relative weights/weightings among the different CA QoS classes may remain constant. The non-CA devices may utilize, or be assigned, static priority weights as part of the methodology. The CA weights may be determined in accordance with characteristics of the CA traffic, one or more scheduling algorithms, and/or load balancing policies among the different carriers. As described in further detail below, the CA weights may be initialized in proportion to the capacities of the different carriers in an aggregation group, and then updated/modified via an iterative process until steady-state values are obtained upon a condition of convergence.

As described herein, the CA devices may transmit data/traffic across multiple carriers. The throughput of the CA devices may be represented as the aggregated throughput over all of the carriers of the group of carriers utilized by the CA devices. When a proportionally-fair scheduler is employed for the CA devices in a given cell, the instantaneous dynamic scheduler priority weight of a CA device belonging to priority class k ($w_k$) would be given by:

$$w_k = g_k \times (T_k/T),$$

where $g_k$ denotes the static component of priority accorded to class k (for both CA and non-CA), $T_k$ denotes the average throughput that the class k CA device is receiving at this cell, and T denotes the aggregate average throughput that this device is receiving from all cells that it is concurrently connected to. In contrast to the foregoing, each non-CA device belonging to class k has its scheduler priority statically set at the value $w_k = g_k$. Thus, in accordance with aspects of this disclosure, a scheduling priority for a CA device in relation to each individual carrier utilized by the CA device may effectively incur a penalty in (e.g., may be reduced by) an amount that is in accordance with (e.g., that is in proportion to) throughput contributions from the other carriers utilized by the CA device. Those skilled in the art will appreciate that while a CA device has relatively unhindered access under light loading conditions, to the full capacity of all cells it is concurrently connected to, the penalty part of its dynamic scheduler weight would effectively neutralize the carrier aggregation advantage under congestion, as may be desired. An iterative update to capture the steady-state values of this penalty component, and hence to accurately estimate the device throughputs of all traffic classes (belonging to non-CA as well as CA), so as to facilitate spectrum resource dimensioning, may form a principle/foundation for the algorithm described below.

In view of the foregoing, traffic from each CA device may have a characteristic of self-load balancing, which is to say that the traffic volume that is distributed to each carrier/cell in an aggregated group of cells (e.g., serving a wireless sector) may be proportional to the throughput that the device obtains from that carrier/cell. As an illustrative example, if there were only CA devices in a given network or system, the traffic distributed to the $j^{th}$ cell may be proportional to $D_j/\Sigma_l D_l$, where $D_j$ is the capacity of the $j^{th}$ cell/carrier. This would result in an equal physical resource block (PRB) utilization amongst the different carriers.

In many embodiments (e.g., in many networks or systems), there will be a mix of CA devices and non-CA devices present. In some embodiments, non-CA device traffic may be balanced based on certain criteria (e.g., certain overall performance criteria) after considering the impact of the CA traffic (potentially as part of a background task/methodology). To demonstrate, an example of a non-CA load balancing rule/policy would be to maintain equal resource utilization (e.g., equal PRB utilization) across all carrier bands in an aggregated group of carriers/cells. Other forms/types of rules/policies may be used in some embodiments.

Figure 2C:
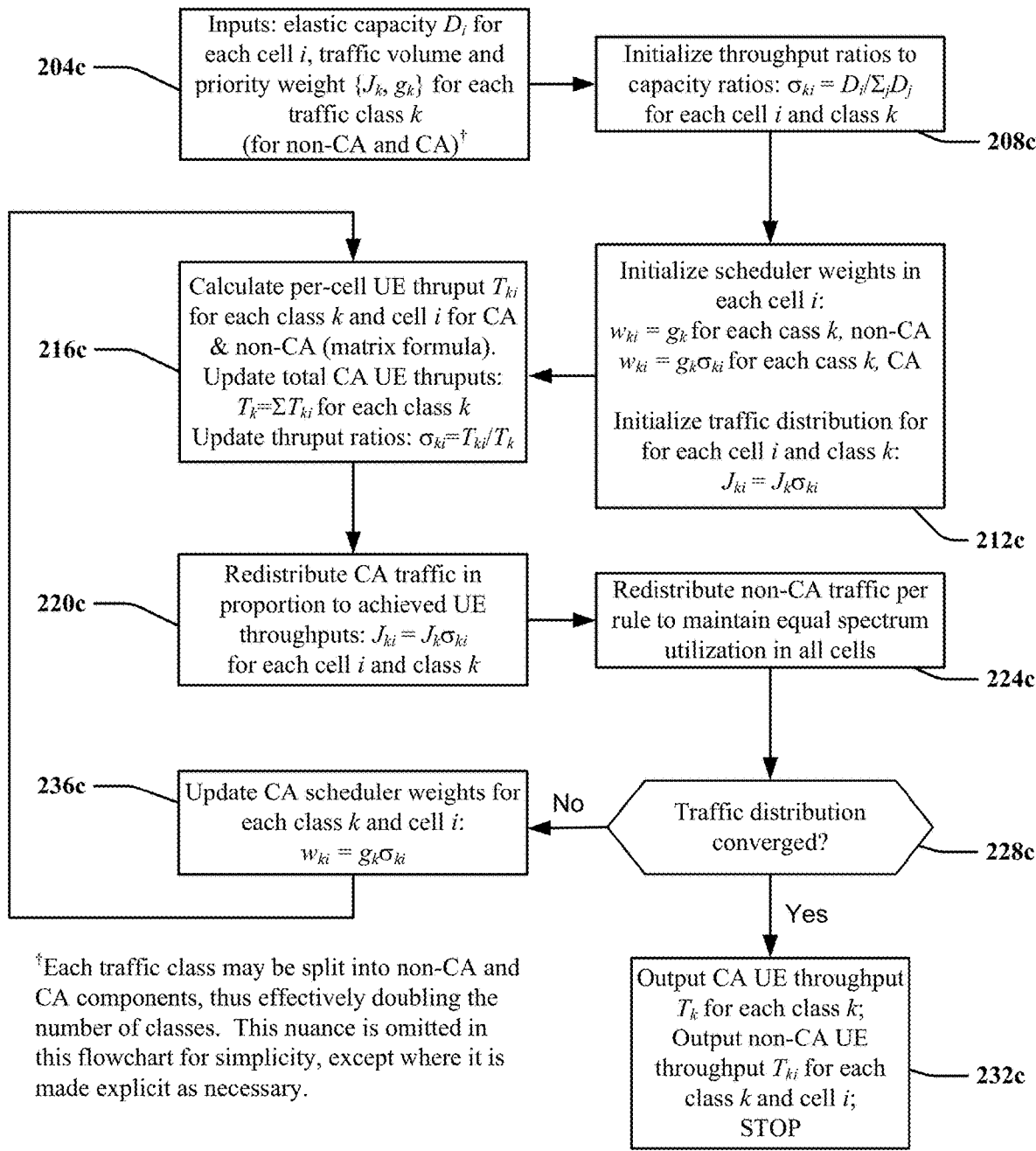
FIG. 2C depicts an illustrative embodiment of a method for computing user equipment (UE) throughput in accordance with various aspects described herein.

Referring now to FIG. 2C, an illustrative embodiment of a method 200c in accordance with various aspects described herein is shown. The method 200c may be implemented/executed as part of one or more algorithms to calculate throughput associated with CA and non-CA devices, which in turn may influence a distribution of traffic as described in further detail below. Blocks/operations (or one or more portions thereof) of the method 200c may be executed iteratively/repeatedly until a convergence is obtained/achieved in terms of the distribution of traffic for different priority classes of traffic. The blocks/operations of the method 200c may be executed, in whole or in part, in conjunction with one or more systems, apparatuses, devices, and/or components, such as for example the systems, apparatuses, devices, and components described herein.

In block 204c, inputs to the algorithmic loop are fetched, comprising of (i) the elastic data capacity $D_i$ of each cell in the load balanced/carrier aggregated group, i=1, ..., Ψ; and (ii) the traffic volume $J_k$ and static priority weight $g_k$ for each elastic traffic class k=2, ... M−1. For purposes of illustration, and continuing the example set forth above where there are four elastic data classes (with indices k=2 through k=5), the static priority weights may be set as $g_2=8$, $g_3=4$, $g_4=2$, and $g_5=1$. The particular values (8, 4, 2, and 1) associated with the weights $g_2$ through $g_5$ in this example are arbitrary/representative/illustrative, and are not binding for purposes of a general execution of the method 200c (e.g., a general execution of the block 204c). Additionally, more or fewer than four elastic data classes may be used in some implementations of the method 200c/the block 204c. Treating CA devices and non-CA devices as distinct entities, would require a total of eight classes (4×2=8) in conjunction with the execution of the method 200c. However, in the interests of simplified bookkeeping, only the basic four elastic data classes are explicitly shown, with the distinctions applicable to the respective CA and non-CA components brought out as needed.

In block 208c, a critical set of parameters (for load balancing as well as dynamic weight assignment), namely throughput ratios $\{\sigma_{ki}\}$ is initialized. In the course of execution, these parameters may track ratios of CA device throughputs in particular cells to the total system throughputs (on a per-class basis). At the start of execution, in block 208c, these values are uniformly initialized to ratios of the cell capacities to the total system capacity (sum of cell capacities), $C_i/\Sigma_j C_j$. Execution of block 208c may facilitate an initial balancing of the load/traffic in the network/system as between CA devices/traffic and non-CA devices/traffic.

In block 212c, scheduler priority weights for the non-CA traffic categories may be initialized to the respective static priority weights (on a per-class basis) from block 204c. Next, scheduler priority weights for the CA traffic categories may be initialized to the product of the respective static priority weights (on a per-class basis) and throughput ratios (on a per class per cell basis) from block 208c. Finally, traffic volumes may be distributed to each cell in proportion to the respective values of throughput ratio (for non-CA as well as CA categories). Thus, in the example considered above, each cell i may have four CA weights corresponding to the CA variants of the four elastic data classes, and four non-CA weights corresponding to the non-CA variants of the four elastic data classes.

In block 216c, the complete set of per-cell per-elastic class and per-CA/non-CA average device throughputs, $\{T_{ki}^{CA}, T_{ki}^{non-CA}, k=2, \ldots, M-1, i=1, \ldots, \Psi\}$, may be calculated using the matrix equations (Fayolle equations) described earlier. For example, the throughput for a carrier/cell may be calculated in accordance with the Fayolle equation set forth above, utilizing the weights of block 212c in the first instance and the weights of block 236c described below in subsequent instances. As part of block 216c, and for the traffic that is attributable to the CA devices, the total system throughput $T_k$ for each class k may be determined/calculated by summing the individual throughput values $\{T_{ki}\}$ across the carriers that are included in the aggregated CA group. Finally, the set of throughput ratios $\{\sigma_{ki}\}$ may be updated as ratios of the computed per-cell CA device throughputs to the corresponding system aggregates (on a per-class, per-cell basis)

In block 220c, traffic that is attributable to the CA devices may be redistributed to each carrier i based on the throughput ratios calculated in block 216c. For example, in block 220c the redistribution of the CA traffic belonging to each class k to the $i^{th}$ carrier may be in accordance with (e.g., may be in proportion to) the corresponding ratio of the computed CA throughput on that carrier ($T_{ki}$) to the total class k CA throughput ($T_k$).

In block 224c, traffic that is attributable to the non-CA devices may be redistributed in accordance with one or more load balancing rules/policies, such as for example an equal PRB utilization rule/policy as set forth above. In an exemplary embodiment based on the equal PRB utilization policy, the non-CA traffic splits per cell (to achieve equal PRB utilization) may be computed in terms of the corresponding CA throughput ratios computed in block 216c as follows:

$$J_{ki}=[(C_i/C)+(J_k^{CA}/J_k^{non-CA})((C_i/\Sigma_j C_j)-\sigma_{k,i})], k=2, \ldots, M-1; i=1, \ldots, \Psi$$

In block 228c, a determination may be made if the distribution of traffic has converged. Whether the distribution of traffic has converged may be based on a comparison (e.g., a statistical comparison) between variations in the distribution of the traffic components $\{J_{ki}^{CA}, J_{ki}^{non-CA}\}$ (for example, from one visit to block 228c to the next—as implied, this requires memorization of values from the past) relative to one or more thresholds. The threshold(s) may be selected to ensure sufficient accuracy on the one hand, while at the same time avoiding unnecessary executions/repetitions of blocks of the method 200c on the other hand.

If, in block 228c, it is determined that the traffic distribution has converged, the method 200c may end as shown in block 232c after outputting the computed device throughput values (which may in turn be compared against performance targets to aid in the resource/spectrum upgrade decision process). Otherwise, flow may proceed from block 228c to block 236c.

In block 236c, the respective values of each of the CA scheduler weights (compare with block 212c) for each cell/carrier i and traffic class k may be updated to be equal to the product of the respective static weight and the current value of the respective CA throughput ratio (the ratio $\sigma_{ki}=T_{ki}/T_k$ as determined in block 220c). Note that the static scheduler weights for the non-CA traffic components remain unchanged from their initial values set in block 212c. From block 236c, flow may proceed to block 216c.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, aspects of the disclosure may be utilized to allocate resources. When a network is lightly loaded, CA devices may utilize as much/as many resources as they are able to in order to increase throughput and enhance QoE/QoS. Conversely, when the network is heavily loaded, the CA devices may be forced to forego utilizing resources in order to avoid depleting resources (thereby ensuring such resources are available for non-CA devices). Resource allocations as between CA devices and non-CA devices may adapt in response to changes in network conditions (e.g., changes in the amount of traffic or load in the network), by virtue of the dynamic penalization factor in the CA scheduler weights and the self-load-balancing property of CA traffic.

Aspects of this disclosure may apply/utilize (static portions of) scheduler weights that are representative of relative priorities/classes of traffic. As described herein, such weights may be used to allocate a greater share of resources to higher grades/classes of traffic.

Aspects of this disclosure are directed to apparatuses and methods for estimating throughputs associated with communication devices, such as user equipment and client devices. In particular, aspects of this disclosure include a calculation of throughput values for co-existing CA devices and non-CA devices in a system or network. As demonstrated herein, the throughput values may be utilized to allocate/distribute traffic between cells/carriers.

While some of the specific, example embodiments set forth herein provide for resource or traffic allocations/distributions on the basis of a device being a CA device or a non-CA device, the techniques and the methodology set forth herein may be applied more generally in accordance with any parameter/variable associated with a communication device and/or a network. For example, if a first cell has a first device located therein that is capable of processing a first amount of load (e.g., the first device has a first processing capability), and a second cell has a second device located therein that is capable of processing a second amount of load (e.g., the second device has a second processing capability), then the total load may be distributed to each of the cells/devices in proportion to their respective processing capabilities.

Aspects of this disclosure may facilitate a distribution or redistribution of traffic, such as for example CA traffic and/or non-CA traffic, in one or more communication networks or systems. Multiple distributions of such traffic may be distinguished from one another in accordance with an identifier, such as an index. Thus, distributions or redistributions may be referred to herein as a first distribution, a second distribution, a third distribution, a fourth distribution, etc.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the systems 200a and 200c, and the functions of the method 200c presented in FIGS. 1 and 2A-2C. For example, virtualized communication network 300 can facilitate in whole or in part distributing carrier aggregated traffic amongst a plurality of cells of a network, initializing a first plurality of weights for each cell of the plurality of cells, wherein for each cell, each of the first plurality of weights is associated with a respective traffic class included in a plurality of traffic classes, calculating a throughput of each cell of the plurality of cells, calculating a total throughput of the plurality of cells in accordance with the calculating of the throughput of each cell, and redistributing the carrier aggregated traffic amongst the plurality of cells based on the throughput of each cell and the total throughput. Virtualized communication network 300 can facilitate in whole or in part calculating a throughput of each cell of a plurality of cells of a communication network, calculating a total throughput of the plurality of cells in accordance with the calculating of the throughput of each cell, and redistributing carrier aggregated traffic amongst the plurality of cells, wherein each cell obtains a respective portion of the carrier aggregated traffic as part of the redistributing in proportion to a ratio of the throughput of the cell relative to the total throughput. Virtualized communication network 300 can facilitate in whole or in part calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
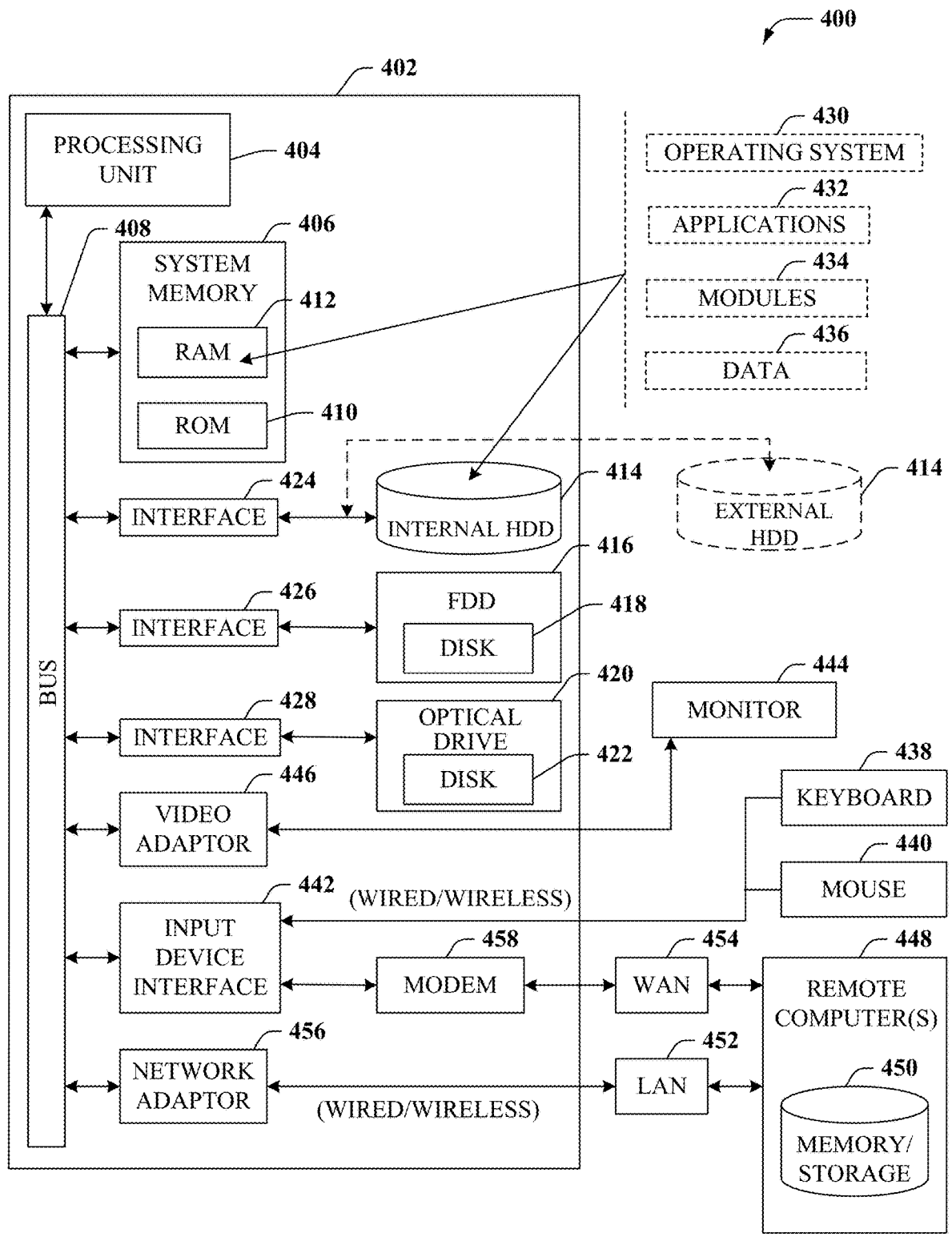
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part distributing carrier aggregated traffic amongst a plurality of cells of a network, initializing a first plurality of weights for each cell of the plurality of cells, wherein for each cell, each of the first plurality of weights is associated with a respective traffic class included in a plurality of traffic classes, calculating a throughput of each cell of the plurality of cells, calculating a total throughput of the plurality of cells in accordance with the calculating of the throughput of each cell, and redistributing the carrier aggregated traffic amongst the plurality of cells based on the throughput of each cell and the total throughput. Computing environment 400 can facilitate in whole or in part calculating a throughput of each cell of a plurality of cells of a communication network, calculating a total throughput of the plurality of cells in accordance with the calculating of the throughput of each cell, and redistributing carrier aggregated traffic amongst the plurality of cells, wherein each cell obtains a respective portion of the carrier aggregated traffic as part of the redistributing in proportion to a ratio of the throughput of the cell relative to the total throughput. Computing environment 400 can facilitate in whole or in part calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
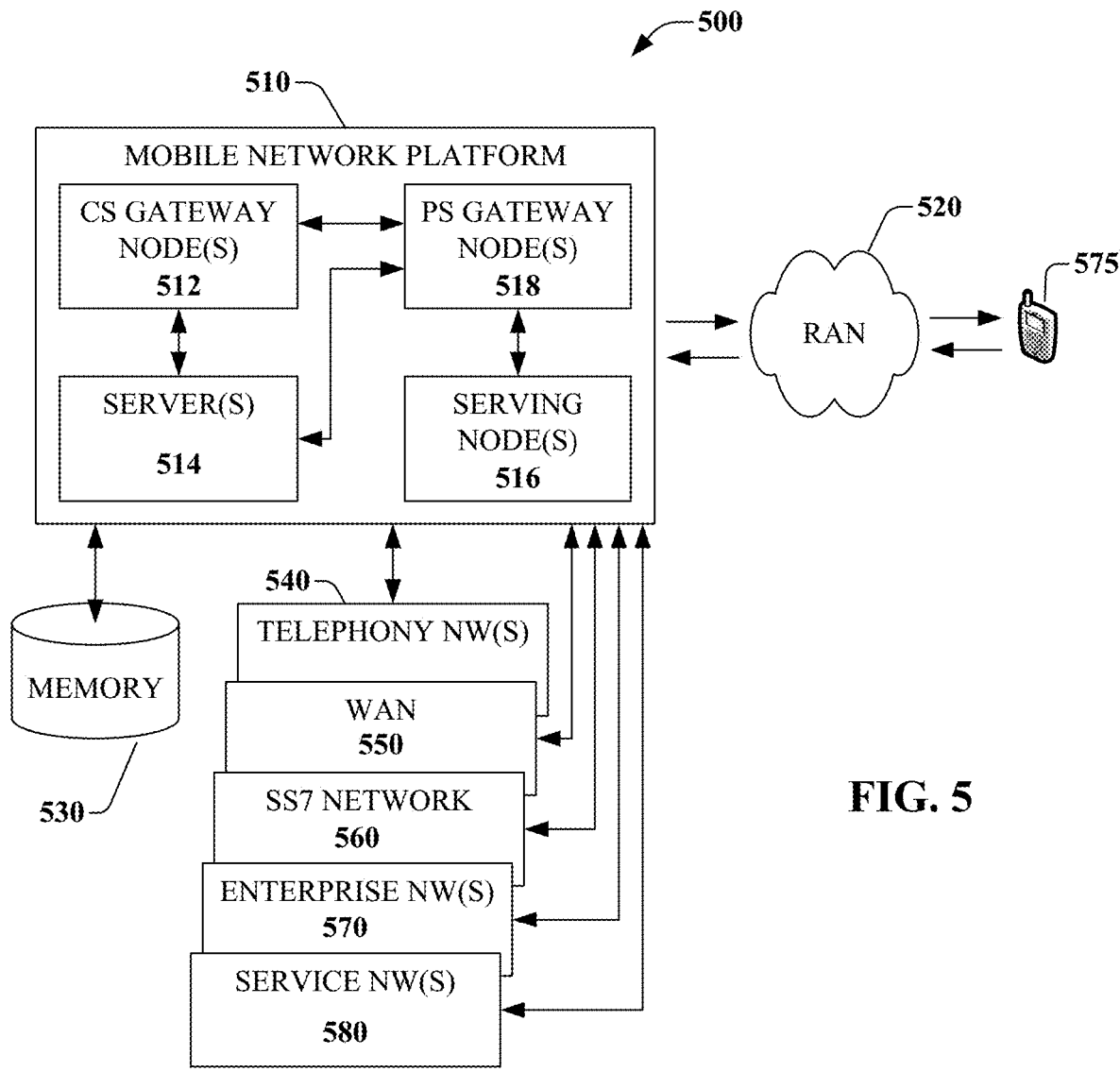
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part distributing carrier aggregated traffic amongst a plurality of cells of a network, initializing a first plurality of weights for each cell of the plurality of cells, wherein for each cell, each of the first plurality of weights is associated with a respective traffic class included in a plurality of traffic classes, calculating a throughput of each cell of the plurality of cells, calculating a total throughput of the plurality of cells in accordance with the calculating of the throughput of each cell, and redistributing the carrier aggregated traffic amongst the plurality of cells based on the throughput of each cell and the total throughput. Platform 510 can facilitate in whole or in part calculating a throughput of each cell of a plurality of cells of a communication network, calculating a total throughput of the plurality of cells in accordance with the calculating of the throughput of each cell, and redistributing carrier aggregated traffic amongst the plurality of cells, wherein each cell obtains a respective portion of the carrier aggregated traffic as part of the redistributing in proportion to a ratio of the throughput of the cell relative to the total throughput. Platform 510 can facilitate in whole or in part calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
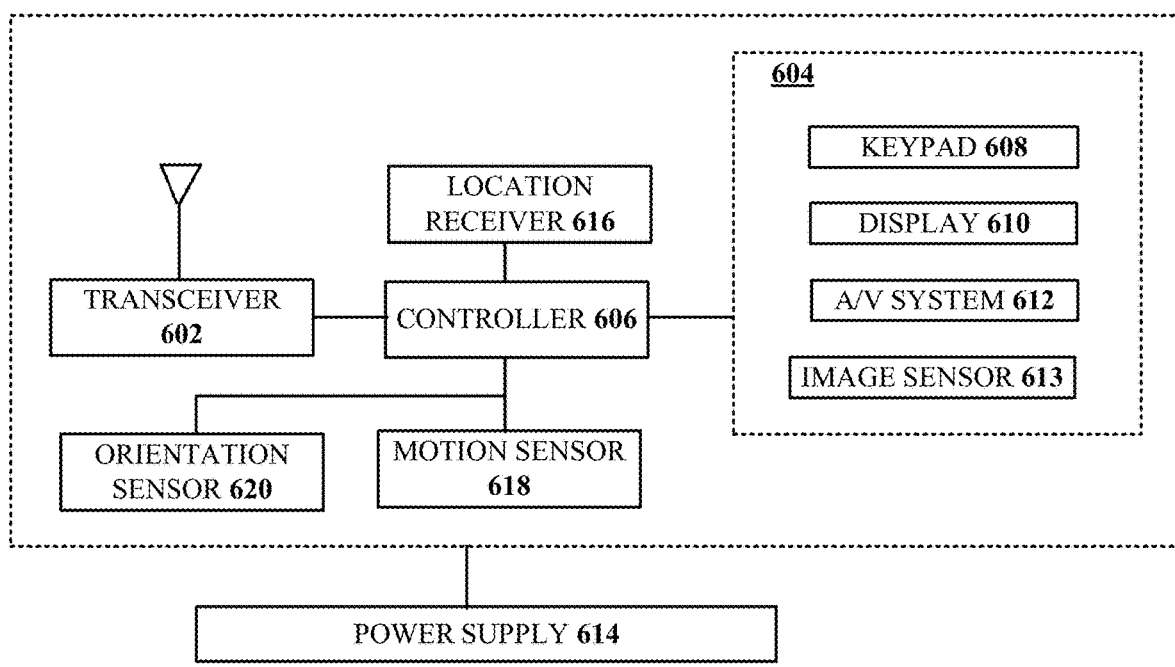
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part distributing carrier aggregated traffic amongst a plurality of cells of a network, initializing a first plurality of weights for each cell of the plurality of cells, wherein for each cell, each of the first plurality of weights is associated with a respective traffic class included in a plurality of traffic classes, calculating a throughput of each cell of the plurality of cells, calculating a total throughput of the plurality of cells in accordance with the calculating of the throughput of each cell, and redistributing the carrier aggregated traffic amongst the plurality of cells based on the throughput of each cell and the total throughput. Computing device 600 can facilitate in whole or in part calculating a throughput of each cell of a plurality of cells of a communication network, calculating a total throughput of the plurality of cells in accordance with the calculating of the throughput of each cell, and redistributing carrier aggregated traffic amongst the plurality of cells, wherein each cell obtains a respective portion of the carrier aggregated traffic as part of the redistributing in proportion to a ratio of the throughput of the cell relative to the total throughput. Computing device 600 can facilitate in whole or in part calculating a throughput of each cell of a plurality of cells of a communication network, calculating a total throughput of the plurality of cells, and distributing, in accordance with a first distribution, carrier aggregated traffic amongst the plurality of cells, wherein each cell obtains a respective portion of the carrier aggregated traffic as part of the first distribution in accordance with the throughput of the cell and the total throughput.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   distributing carrier aggregated traffic amongst a plurality of cells of a network;
   initializing a first plurality of scheduler weights for each cell of the plurality of cells, wherein for each cell, each of the first plurality of scheduler weights is associated with a respective traffic class included in a plurality of traffic classes, including non-carrier aggregated traffic and the carrier aggregated traffic;
   calculating a throughput of each cell of the plurality of cells;
   calculating a total throughput of the plurality of cells in accordance with the calculating of the throughput of each cell; and
   redistributing the carrier aggregated traffic amongst the plurality of cells to more than one cell in the plurality of cells based on the throughput of each cell, the first plurality of scheduler weights, and the total throughput.

2. The device of claim 1, wherein the redistributing of the carrier aggregated traffic amongst the plurality of cells comprises redistributing a first portion of the carrier aggregated traffic to a first cell of the plurality of cells based on the throughput of the first cell.

3. The device of claim 2, wherein the redistributing of the carrier aggregated traffic amongst the plurality of cells comprises redistributing a second portion of the carrier aggregated traffic to a second cell of the plurality of cells based on the throughput of the second cell.

4. The device of claim 2, wherein the first portion of the carrier aggregated traffic is based on a ratio of the throughput of the first cell relative to the total throughput.

5. The device of claim 1, wherein the operations further comprise:
   determining a capacity of each cell of the plurality of cells; and
   determining a total capacity of the plurality of cells.

6. The device of claim 5, wherein the operations further comprise:
   obtaining values of a second plurality of scheduler weights, wherein each scheduler weight of the second plurality of scheduler weights corresponds to a respective traffic class included in the plurality of traffic classes.

7. The device of claim 6, wherein the initializing of the first plurality of scheduler weights for each cell of the plurality of cells is based on the values of the second plurality of scheduler weights, the capacity of the cell, and the total capacity.

8. The device of claim 7, wherein the initializing of the first plurality of scheduler weights for each cell of the plurality of cells comprises multiplying the values of the second plurality of scheduler weights by a ratio of the capacity of the cell relative to the total capacity.

9. The device of claim 5, wherein the distributing of the carrier aggregated traffic amongst the plurality of cells comprises distributing a first portion of the carrier aggregated traffic to a first cell of the plurality of cells in proportion to a ratio of the capacity of the first cell relative to the total capacity.

10. The device of claim 1, wherein the operations further comprise:
   determining that a convergence in a distribution of traffic has not been obtained, wherein the traffic includes the carrier aggregated traffic and non-carrier aggregated traffic.

11. The device of claim 10, wherein the operations further comprise:
   responsive to the determining that the convergence in the distribution of traffic has not been obtained, updating the first plurality of scheduler weights for each cell of the plurality of cells.

12. The device of claim 11, wherein the updating of the first plurality of scheduler weights for each cell of the plurality of cells is based on multiplying values of the first plurality of scheduler weights by a ratio of the throughput of the cell relative to the total throughput.

13. The device of claim 10, wherein the determining that the convergence in the distribution of the traffic has not been obtained is based on a comparison between variations in the distribution of the traffic relative to one or more thresholds.

14. The device of claim 1, wherein the operations further comprise:
   distributing non-carrier aggregated traffic amongst the plurality of cells; and
   subsequent to the redistributing of the carrier aggregated traffic amongst the plurality of cells, redistributing the non-carrier aggregated traffic amongst the plurality of cells in accordance with a policy.

15. The device of claim 14, wherein the policy comprises equalizing physical resource block (PRB) utilization across the plurality of cells.

16. A non-transitory machine-readable medium, comprising executable instructions that, when executed by a processing system including a processor, facilitate performance of operations, the operations comprising:
   calculating a throughput of each cell of a plurality of cells of a communication network;
   calculating a total throughput of the plurality of cells in accordance with the calculating of the throughput of each cell; and
   redistributing carrier aggregated traffic amongst the plurality of cells to more than one cell in the plurality of cells, wherein each cell obtains a respective portion of the carrier aggregated traffic as part of the redistributing in proportion to a ratio of the throughput of the cell relative to the total throughput.

17. The non-transitory machine-readable medium of claim 16, wherein the calculating of the throughput of each cell of the plurality of cells is based on a plurality of scheduler weights, and wherein each scheduler weight of the plurality of scheduler weights is associated with a respective data class included in a plurality of data classes.

18. The non-transitory machine-readable medium of claim 16, wherein the operations further comprise:
   distributing non-carrier aggregated traffic amongst the plurality of cells based on a spectrum utilization of each cell, a capacity of each cell, and a total capacity of the plurality of cells; and
   subsequent to the redistributing of the carrier aggregated traffic amongst the plurality of cells, redistributing the non-carrier aggregated traffic amongst the plurality of cells in accordance with a policy.

19. A method, comprising:
   calculating, by a processing system including a processor, a throughput of each cell of a plurality of cells of a communication network;
   calculating, by the processing system, a total throughput of the plurality of cells; and
   distributing, by the processing system and in accordance with a first distribution, carrier aggregated traffic to more than one cell amongst the plurality of cells, wherein each cell obtains a respective portion of the carrier aggregated traffic as part of the first distribution in accordance with the throughput of the cell, scheduler weights associated with a respective traffic class included in a plurality of traffic classes, and the total throughput.

20. The method of claim 19, further comprising:
   prior to the first distribution, distributing, by the processing system and in accordance with a second distribution, the carrier aggregated traffic amongst the plurality of cells, wherein each cell obtains a respective portion of the carrier aggregated traffic as part of the second distribution in proportion to a ratio of a capacity of the cell and a total capacity of the plurality of cells;
   prior to the first distribution, distributing, by the processing system and in accordance with a third distribution, non-carrier aggregated traffic amongst the plurality of cells, wherein each cell obtains a respective portion of the non-carrier aggregated traffic as part of the third distribution in proportion to the ratio of the capacity of the cell and the total capacity of the plurality of cells; and
   subsequent to the first distribution and subsequent to the third distribution, distributing, by the processing system and in accordance with a fourth distribution, the non-carrier aggregated traffic amongst the plurality of cells in accordance with a policy that comprises equalizing resource block utilization across the plurality of cells.

* * * * *